United States Patent
Goodman

(10) Patent No.: US 8,732,249 B2
(45) Date of Patent: May 20, 2014

(54) PROVIDING AN ADVISORY TO A USER OF A PROCESSING SYSTEM

(75) Inventor: William D. Goodman, Collegeville, PA (US)

(73) Assignee: Verizon Services Corp., Ashburn, VA (US)

( * ) Notice: Subject to any disclaimer, the term of this patent is extended or adjusted under 35 U.S.C. 154(b) by 1639 days.

(21) Appl. No.: 10/157,590

(22) Filed: May 29, 2002

(65) Prior Publication Data

US 2003/0233408 A1    Dec. 18, 2003

(51) Int. Cl.
*G06F 15/16*      (2006.01)

(52) U.S. Cl.
USPC ........................................ 709/206; 709/207

(58) Field of Classification Search
USPC ......... 709/201, 206, 207, 219, 213, 214, 215, 709/226
See application file for complete search history.

(56) References Cited

U.S. PATENT DOCUMENTS

| | | | | |
|---|---|---|---|---|
| 5,826,062 A * | 10/1998 | Fake et al. | ...................... | 715/207 |
| 5,906,656 A * | 5/1999 | Keller et al. | .................. | 709/200 |
| 6,014,688 A * | 1/2000 | Venkatraman et al. | ....... | 709/206 |
| 6,073,133 A * | 6/2000 | Chrabaszcz | ..................... | 707/10 |
| 6,073,166 A * | 6/2000 | Forsen | .......................... | 709/206 |
| 6,212,553 B1 * | 4/2001 | Lee et al. | ....................... | 709/206 |
| 6,360,252 B1 * | 3/2002 | Rudy et al. | .................... | 709/206 |
| 6,434,601 B1 * | 8/2002 | Rollins | .......................... | 709/206 |
| 6,453,338 B1 * | 9/2002 | Shiono | .......................... | 709/206 |
| 6,460,074 B1 * | 10/2002 | Fishkin | ........................ | 709/206 |
| 6,505,236 B1 * | 1/2003 | Pollack | ......................... | 709/206 |
| 6,505,237 B2 * | 1/2003 | Beyda et al. | .................. | 709/206 |
| 6,546,417 B1 * | 4/2003 | Baker | ............................ | 709/206 |
| 6,651,087 B1 * | 11/2003 | Dennis | ......................... | 709/206 |
| 6,671,718 B1 * | 12/2003 | Meister et al. | ................ | 709/206 |
| 6,898,622 B1 * | 5/2005 | Malik | ............................ | 709/206 |
| 6,938,065 B2 * | 8/2005 | Jain | .............................. | 709/201 |
| 6,970,908 B1 * | 11/2005 | Larky et al. | ................... | 709/206 |
| 7,007,066 B1 * | 2/2006 | Malik | ............................ | 709/206 |
| 7,099,920 B1 * | 8/2006 | Kojima et al. | ................ | 709/206 |
| 7,209,951 B2 * | 4/2007 | Goldberg | ....................... | 709/206 |
| 7,466,803 B2 * | 12/2008 | Burg et al. | .................... | 379/88.18 |
| 7,584,251 B2 * | 9/2009 | Brown et al. | .................. | 709/206 |
| 7,856,476 B2 * | 12/2010 | Halahmi et al. | .............. | 709/206 |
| 7,970,843 B2 * | 6/2011 | Brown et al. | .................. | 709/206 |
| 7,979,691 B2 * | 7/2011 | Stewart et al. | ................ | 713/152 |
| 8,312,093 B2 * | 11/2012 | Brown et al. | .................. | 709/206 |
| 2005/0044158 A1 * | 2/2005 | Malik | ............................ | 709/206 |
| 2006/0095527 A1 * | 5/2006 | Malik | ............................ | 709/206 |
| 2007/0162551 A1 * | 7/2007 | Kogure et al. | ................ | 709/206 |
| 2009/0030997 A1 * | 1/2009 | Malik | ............................ | 709/206 |
| 2011/0078264 A1 * | 3/2011 | Halahmi et al. | .............. | 709/206 |
| 2011/0225253 A1 * | 9/2011 | Brown et al. | .................. | 709/206 |
| 2012/0173644 A1 * | 7/2012 | Brown et al. | .................. | 709/206 |

FOREIGN PATENT DOCUMENTS

EP      1087315 A2 *   3/2001

\* cited by examiner

*Primary Examiner* — Sargon Nano

(57) ABSTRACT

There is provided a method for providing an advisory to a user of a processing system. The method includes detecting an occurrence of a term in an input to the processing system provided by the user, and providing a reminder for the user to perform an action if the term occurred. The method is particularly well suited for reminding a user to include an attachment with an email message.

19 Claims, 3 Drawing Sheets

PROVIDING AN ADVISORY TO A USER OF A PROCESSING SYSTEM

BACKGROUND OF THE INVENTION

1. Field of the Invention

The present invention relates to communication between a computer system and a human user of the computer system, and more particularly, to a technique in which the computer system monitors an input of the user and, based on the input, provides a reminder for the user to perform an action. The invention can help the user to correct or avoid errors. One embodiment of the present invention reviews an electronic mail (email) message prepared by the user, and under an appropriate condition, provides a reminder for the user to include an attachment with the email.

2. Description of the Prior Art

Some conventional computer software applications for computer processing systems include aids that review or actively monitor an input provided by a user, and based on the input, or a perceived error in the input, provide a recommendation to the user. The aids often improve the quality of work performed by the user and the user's overall level of satisfaction with the software application. Several such aids are described below.

When a user of a file has completed working with the file, the user typically closes the file. If the user makes a change to the contents of the file, but has not yet saved the file when providing a command to close the file, some software applications display an advisory giving the user a further opportunity to save the file before closing it. This aid operates by recognizing a state of a combination of basic conditions.

If ((a user changed a file) AND (the user has not yet saved the file) AND (the user has issued a command to close the file)), then display an advisory.

A spell checker can compare a word in a document with words in a list of correctly spelled words. If the spelling of the word being reviewed does not match with that of any word in the list, then the spell checker flags the word as being potentially misspelled. The user taking notice of such a flagged word is alerted to, and thus has an opportunity to correct, the potential misspelling.

A grammar checker can recognize a combination or pattern of words that either does not conform to a grammar rule, or affirmatively violates a grammar rule. For example, a grammar checker can recognize a text string "the the cat", and flag the double occurrence of the word "the".

Some word processors proactively provide assistance to a user while the user is preparing a document. For example, a word processor can recognize a character string that appears to be a beginning of a date, and react by displaying a current date. In another case the word processor can recognize a character string that appears to be a beginning of a word or phrase, and react by displaying a suggested full-length version of the apparent word or phrase. In yet another case the word processor can recognize a format of a document as being a beginning of a letter, and react by offering to assist by providing a template within which the letter can be structured.

Some aids are also provided in an email application. An email message usually includes a header that contains an email address of a party with whom a user of the email application is corresponding. The email application can review the header and query the user as to whether the user wishes to add the email address to an address book.

Generally, these aids provide a recommendation to the user either upon recognition of a particular set of basic conditions, as in the case of providing a reminder to save a file, or upon a failure to recognize a particular condition, as in the case of the spell checker. The word processor and email applications may go a bit further in that they monitor a word, a phrase or a format, and react by offering a suggestion or other form of assistance. However, none of these aids appear to monitor or recognize a term in the user's input and react by providing a reminder for the user to perform an action.

There is a need for an improved technique for providing an advisory to a user of a processing system. For example, if a user of an email application prepares an email message in which the user indicates an intent to include an attachment with the email, the user would benefit by being provided with a reminder to include the attachment.

SUMMARY OF THE INVENTION

The present invention provides an improved technique for providing an advisory to a user of a processing system.

A first method in accordance with the present invention provides an advisory to a user of a processing system. The method includes detecting an occurrence of a term in an input to the processing system provided by the user, and providing a reminder for the user to perform an action if the term occurred. There is also provided a system for performing the method.

Another method in accordance with the present invention provides an advisory to a user of an email system. This method includes (i) detecting an occurrence of a term in a body of an email message provided by the user, wherein the term is selected from the group consisting of (a) "attach", (b) "attached", (c) "attaching" and (d) "attachment", (ii) detecting that the user has not yet included an attachment with the email, and (iii) providing a reminder for the user to include the attachment if the term occurred and the attachment is not included. There is also provided a system for performing this method.

Yet another method in accordance with the present invention provides an advisory to a user of an email system. The method includes detecting a command to transmit an email message, and thereafter, reminding the user of an opportunity for the user to include an attachment with the email message.

DESCRIPTION OF THE INVENTION

The present invention relates to communication between a computer processing system and a human user of the processing system. The invention monitors the user's actions, e.g., input to the processing system, and checks the actions against a default or user-configured store of trigger actions. When a trigger action is encountered, the invention initiates a recommendation or reminder for the user to perform an action. The recommendation or reminder can help the user to avoid an error.

An exemplary implementation of the present invention is in the context of an email application. In this implementation, the invention monitors an email message being constructed by a user of the email application, and looks for the following set of conditions:

(i) the message contains the word "attached";
(ii) the user issues a "send" command to transmit the message; and
(iii) the message does not include an attachment.

In reaction to this set of conditions, the invention suspends processing of the "send" command and alerts the user to the situation, thus providing the user with an opportunity to take corrective action. The alert can be, for example, a reminder for the user to include the attachment.

Figure 1:
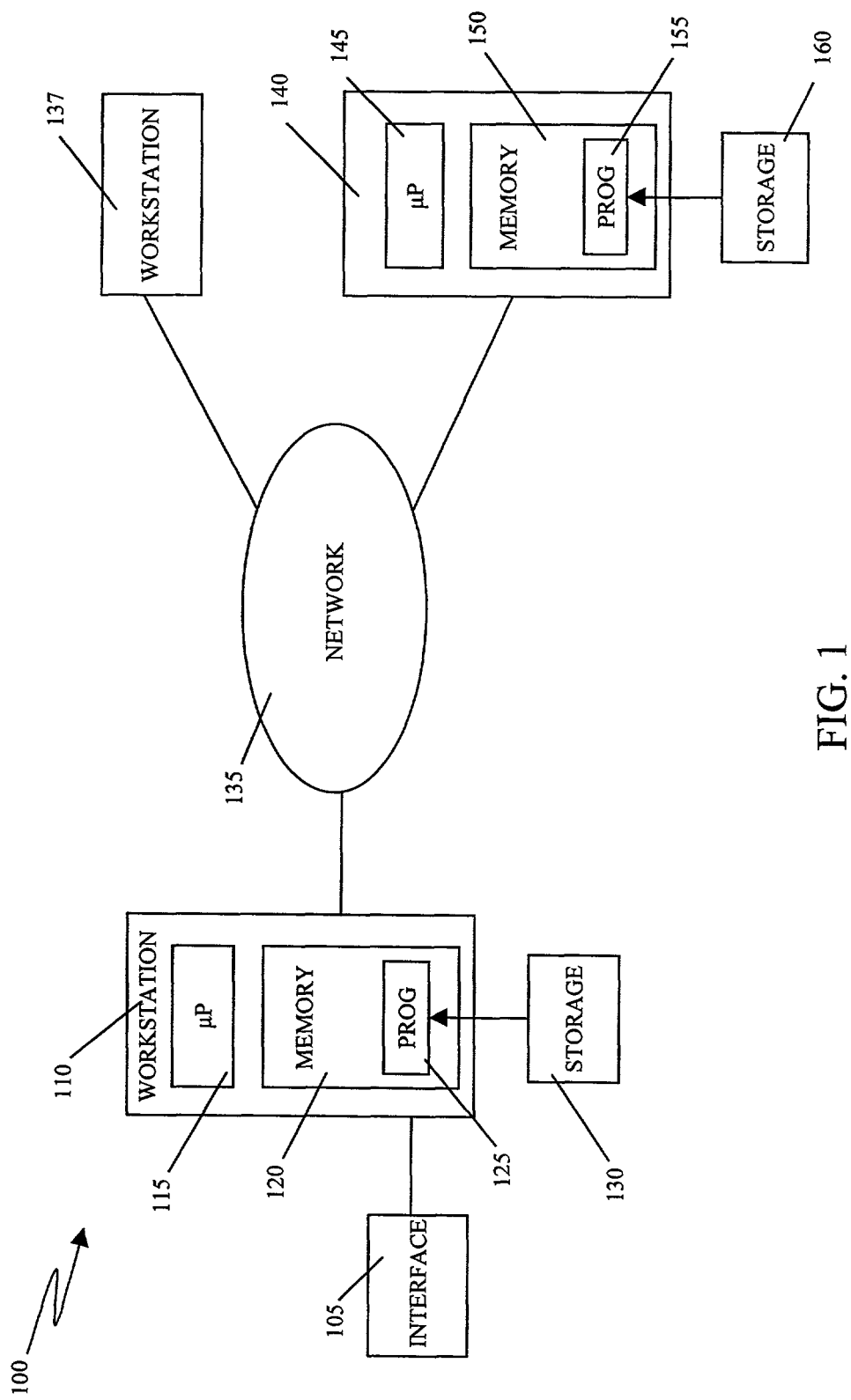
FIG. 1 is a block diagram of a computer system that includes a workstation configured for employment of the present invention.

FIG. 1 is a block diagram of a computer system 100 that includes workstations 110 and 137, and a server 140 coupled for communication with workstations 110 and 137 via a network 135. Network 135 can be any conventional network such as a local area network (LAN), a wide area network (WAN), an Intranet, an extranet, the Internet, or a combination thereof.

Workstation 110 may be implemented on a general purpose microcomputer, such as one of the members of the Sun™ Microsystems family of computer systems, one of the members of the IBM™ personal computer (PC) family, or any conventional work-station or graphics computer device. Workstation 110 includes a user interface 105, a processor 115, and a memory 120.

User interface 105 is an input/output subsystem that enables a user to communicate with the other components of workstation 110. It may include, for example, components such as a keyboard, a cursor control (e.g., a mouse, a trackball or a joystick), a display, a printer, a speech recognition subsystem, and a speech synthesizer.

Processor 15 is a processing device, such as a microprocessor. It executes machine-readable instructions to process and send information via interface 105 and network 135.

Memory 120 stores data and instructions for controlling the operation of processor 115. In particular, memory 120 contains a program 125 of data and instructions for execution of the present invention. Program 125 may be organized as a plurality of program modules. An appropriate implementation of memory 120 includes a hard drive and a random access memory (RAM).

As further described below, program 125 includes a module for detecting an occurrence of a term in an input to workstation 110 provided by the user of interface 105, and a module for providing a reminder for the user to perform an action if the term occurred. It also includes a module for detecting that the user has not yet performed the action.

Program 125 may also include a module for detecting a condition, where providing of the reminder is performed if the term occurred and the condition is detected (or, depending on the condition, not detected). The user may define the condition and the action in advance.

In a further refinement of the invention, program 125 includes (a) a module for tracking the behavior of the user, and (b) a module for determining, from the behavior, a probability of the user performing the action if the user uses the term. The module for providing the reminder provides the reminder if the probability is greater than a threshold value. Preferably, the reminder is provided if the probability indicates that the user likely intends to perform the action.

In one embodiment of the present invention, program 125 is a plugin to an email application, and as such, it provides an advisory to a user of the email application. The user of interface 105 intends to use the email application to send an email message from workstation 110 to a recipient at workstation 137.

One embodiment of program 125 includes detecting a command to transmit an email message, and thereafter, reminding the user of an opportunity for the user to include an attachment with the email message. In another embodiment of program 125, if, in the body of the email message the user includes any of the terms (a) "attach", (b) attached", (c) attaching" or (d) attachment", and the user has not included an attachment with the email, then the invention provides a reminder for the user to include the attachment.

Server 140 is a processing station that provides services, such as remote data storage, for other stations on network 135, such as workstations 110 and 137. In the context of the present invention, it also executes a software application that involves a participation of workstation 110, where, for example, server 140 acts as an email server for workstation 110. Server 140 includes a processor 145 and a memory 150, which are functionally similar to processor 115 and memory 120.

Although the instructions for execution of the present invention are indicated above as being embodied in program 125 and installed in memory 120, they may alternatively be embodied in a program 155 and stored in memory 150 for execution by processor 145. In this alternative embodiment, a user of interface 105 would engage in communication with server 140, and in particular, with program 155.

The instructions can also reside on an external storage media 130 or 160 for subsequent loading into memory 120 or 150, respectively. Such a storage media can be any conventional storage media, including, but not limited to, a floppy disk, a compact disk, a magnetic tape, a read only memory, or an optical storage media. The storage media could also be a random access memory, or other type of electronic storage, located on a remote storage system and coupled to either of memory 120 or 150.

Figure 2:
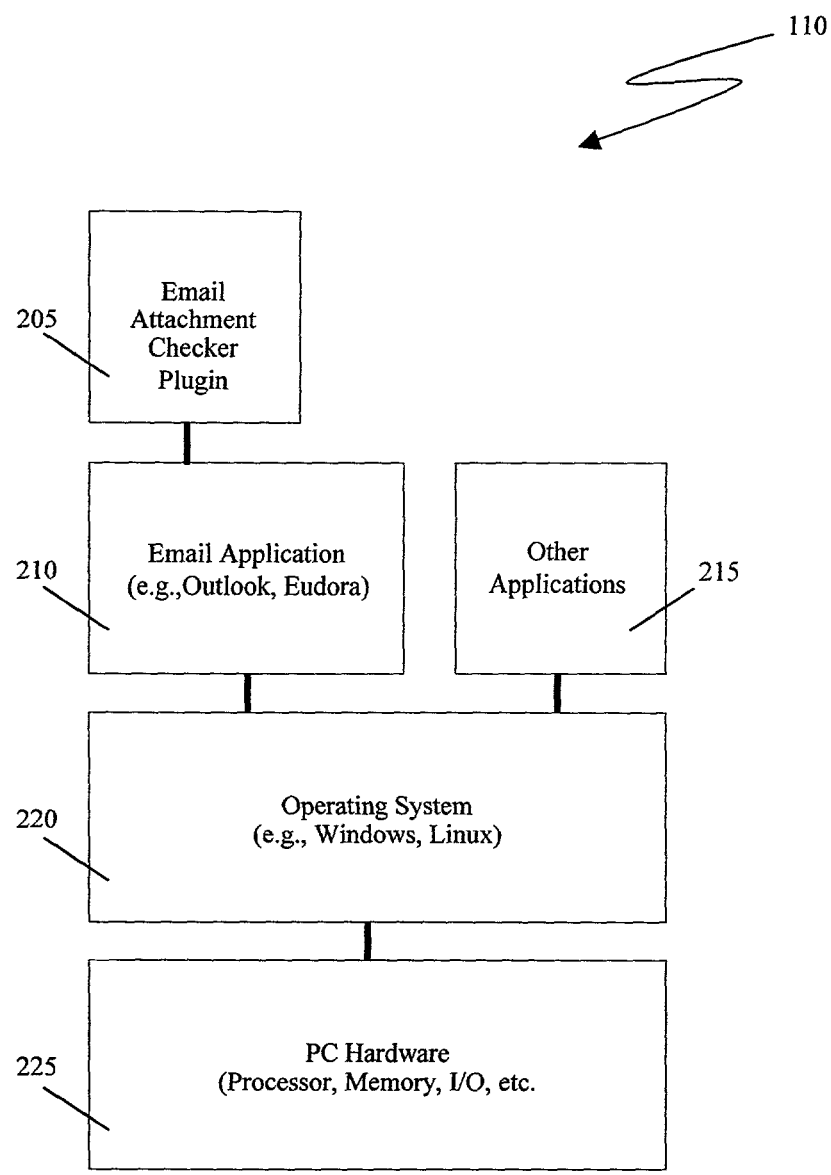
FIG. 2 is a hierarchical block diagram of a workstation that includes the present invention embodied as an email attachment checker plugin.

FIG. 2 is a hierarchical block diagram of workstation 110 that includes the present invention embodied as an email attachment checker plugin 205. Workstation 110 also includes hardware 225, an operating system (OS) 220, an email application 210 and other applications 215.

Hardware 225 is a physical PC platform, e.g., processor 115 and memory 120 as shown in FIG. 1. Operating system 220, email application 210, other applications 215 and plugin 205 are software programs that reside in the memory of hardware 225, i.e., in memory 120.

Operating system 220 can be any conventional operating system. Appropriate examples of operating system 220 include Microsoft® Windows®, and Linux. Microsoft® and Windows® are registered trademarks of Microsoft Corporation.

Email application 210 can be any conventional email application. Suitable examples of email application 210 include Microsoft® Outlook® and Eudora®. Outlook® is a registered trademark of Microsoft Corporation, and Eudora® is a registered trademark of the University of Illinois Board of Trustees.

Other applications 215, as its name implies, represents other software applications that may be installed on workstation 110.

Email attachment checker plugin 205 is a plugin module to email application 210 that provides an error-checking function. One embodiment of email attachment checker plugin 205 detects a command to transmit an email message, and thereafter, reminds the user of an opportunity for the user to include an attachment with the email message.

Another embodiment of email attachment checker 205 searches an email message for a text string, e.g., "attached", prior to allowing the message to be transmitted. If the email message includes the text string, and if the user has not included an attachment, then email attachment checker plugin 205 causes a reminder to be sent to the user to include the attachment.

Figure 3:
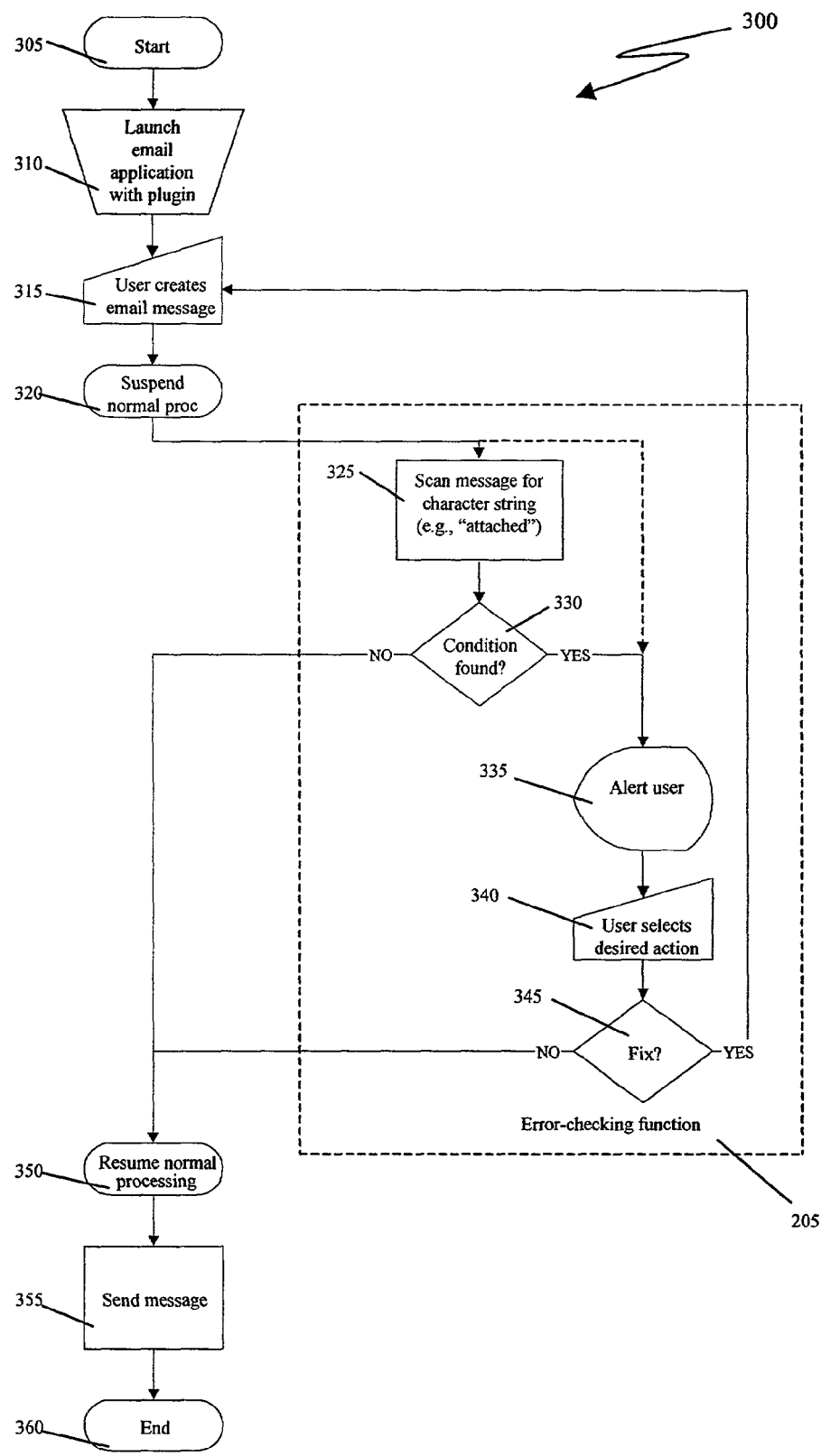
FIG. 3 is a flowchart of a method for providing an advisory to a user of a processing system in accordance with the present invention.

FIG. 3 is a flowchart of a method 300 for providing an advisory to a user of a processing system in accordance with the present invention. In broad terms, method 300 includes detecting an occurrence of a term in an input to the processing system provided by the user, and providing a reminder for the user to perform an action if the term occurred. It may also include, before providing the reminder, detecting that the user has not yet performed the action.

Method 300 may also include, before providing the reminder, detecting a condition, where providing the reminder is performed if the term occurred and the condition is detected (or not detected). The user may define the condition and the action in advance.

In a further refinement, method 300 includes, before detecting the occurrence of the term, tracking behavior of the user, and determining from the behavior, a probability of the user performing the action if the user uses the term. The step of providing the reminder is performed if the probability is greater than a threshold value. Preferably, the reminder is provided if the probability indicates that the user likely intends to perform the action.

For purpose of example, method 300 is presented in the context of an email application, but the invention is not limited as such, but instead may be employed in any application where it is desirable to provide a reminder for the user to perform an action. Features of email attachment checker plugin 205 are represented within a dashed perimeter. Method 300 starts at step 305 and progresses to step 310.

In step 310, the user launches email application 210, which includes email attachment checker plugin 205. Method 300 then progresses to step 315.

In step 315, the user creates an email message. The message may be in a form of a text input as in a text document or a word processor document. If user interface 105 includes a speech recognition capability, then the message may be in a form of an audio input. The user provides a command to transmit the email message, e.g., a "send" command. Method 300 then progresses to step 320.

In step 320, normal execution of email application 210 is suspended, and email attachment checker plugin 205 is invoked.

One embodiment of email check 325 evaluates the email message that has been prepared by the user. In this embodiment of email attachment checker 205, method 300 progresses from step 320 to step 325.

Another embodiment of email attachment checker 205 reminds the user of an opportunity for the user to include an attachment with the email without first evaluating the email message that has been prepared by the user. In this embodiment of email attachment checker 205, method 300 advances from step 320 to step 335 (shown in FIG. 3 with a dashed arrow).

In step 325, email attachment checker plugin 205 scans the email message for a particular condition (or set of conditions), i.e., whether the message contains a text string "attached" AND the email does not include an attachment. Alternative text strings may also be considered, e.g., "attach", "attaching" and "attachment".

In the present example, email attachment checker plugin 205 detects whether the user has performed the action of including the attachment, however, as is well understood in the art of logic design, a determination of a condition, and the resultant of the determination, could be based on the condition being TRUE or FALSE, depending on the nature of the condition. Method 300 progresses to step 330.

In step 330, email attachment checker plugin 205 progresses according to whether the condition was found. If email attachment checker plugin 205 detects the term "attached" AND the email does not include an attachment, then method 330 advances to step 335, else method 300 advances to step 350.

In step 335, email attachment checker plugin 205 causes a reminder to be provided to the user for the user to include an attachment. Such a reminder could be in the form of a text message on a display, or if user interface 105 includes a speech generation capability, an audio message. Method 300 then progresses to step 340.

In step 340, email attachment checker plugin 205 solicits further input from the user as to whether the user intends to take corrective action or to proceed without taking corrective action. Method 300 then progresses to step 345.

In step 345, if the user indicates a wish to take corrective action, then method 300 branches back to step 315. If the user indicates a wish to proceed without taking corrective action, then method 300 advances to step 350.

In step 350, email application 210 resumes normal processing. Method 300 then progresses to step 355.

In step 355, email application 210 transmits the email message. Method 300 then progresses to step 360.

In step 360, method 300 ends.

The present invention is not limited to the features of email attachment checker plugin 205, but instead it can check for any desired condition, and provided a reminder for any desired action. The user can specify the conditions and actions in advance. Some examples are presented below.

(a) Where an email address indicates that an email message is intended for a particular recipient, for example, "John Doe", the present invention can scan a salutation line at the beginning of the message to confirm that it states "Dear John", rather than, for example, "Dear Joe".

(b) In a business setting, where an email is being directed toward a particular customer, the present invention can display a reminder showing that customer's product preferences. As a further improvement, the present invention can prompt the user to offer the preferred product to the customer, or check whether such product is on sale.

(c) The present invention can recognize that an email message is intended for a particular recipient, and provide a reminder to the user of an anniversary or other event. For example, if the user is sending the email to John Doe, the invention can display a reminder that John's birthday is coming up, or that John's birthday was last week.

(d) A user who telecommutes on Fridays may wish for the invention to look for the condition:

(OS is shutting down) AND (day=Thursday) AND (networking config='office')

in order to remind the user to set the networking configuration to 'home' prior to shutting down.

(e) Based on an occurrence of a term in an email message, the present invention can provide a reminder or a suggestion to send a gift. For example, if the message includes the word "Love", a pop-up suggestion or advertisement to send flowers can be displayed.

In a further refinement, the present invention tracks behavior of the user, and determines from the behavior, a probability of the user performing an action if the user uses a particular term (or an equivalent term). Over time, the invention recognizes that some aspect of the user's communication is occasionally, or frequently, accompanied by an action by the user. The reminder is provided if the probability is greater than a threshold value, for example, greater than a 50% probability. For example, if the recipient of an email is "mom", and the user typically attaches a file containing an image, for example of mom's grandchildren, then, although in a present case the user may have included an attachment, the reminder would be displayed if the attachment was not an image file. A potential benefit of this aspect of the invention is that by tracking user behavior, it can automatically identify a potential error and offer to assist the user in correcting the potential error.

The invention can recognize a particular user based on a user password or other form of identifier. However, the behavior tracking feature need not be limited to the behavior of a single user, but instead, could track a population of users to determine a propensity of a random user to perform an action if the random user provides some particular communication.

In an exemplary implementation, a central server ranks error conditions based on how often the error conditions are encountered, and allows a specific end user to request notification if any of a set of "top ten" conditions are encountered on the end user's system. The "top ten" conditions would likely vary over time as applications and user behaviors change. There can be different rankings for different communities, e.g., business user, home user, teen user.

The central server can also track real-time events, such as a network failure or congestion, and notify the end user at an appropriate time. For example, if the end user attempts to establish a video call to the user's grandmother AND there is network congestion, the server notifies the user of the nature and magnitude of the problem and that the quality of the call is not likely to be good.

It should be understood that various alternatives and modifications of the present invention could be devised by those skilled in the art. The present invention is intended to embrace all such alternatives, modifications and variances that fall within the scope of the appended claims.

What is claimed is:

1. A method, comprising:
    detecting an occurrence of a term in an input to a processing system having a processor, a memory, and at least one input/output device, said memory having an application executed by said processor, said input being received using said at least one input/output device into the memory for use by said processor and comprising an electronic message to be sent;
    determining using said processing system whether an attachment to said message is present and, if present, detecting a type of said attachment from said term detected in said input before said electronic message is sent; and
    searching using said processing system for a potential error based on said type and said term.

2. The method of claim 1, further comprising:
    providing an indication using said at least one input/output device to a user of said potential error.

3. The method of claim 2, further comprising:
    providing a second indication to said user using said input/output device that no attachment is associated with said electronic message.

4. The method of claim 1, further comprising:
    offering to assist said user using said input/output device in correcting said potential error.

5. The method of claim 1, further comprising:
    determining using said processing system whether said term indicates that an attachment should be associated with said electronic message.

6. The method of claim 1, wherein a user defines at least one of said term and said type.

7. The method of claim 1, wherein said input into said at least one input/output device further comprises an audio voice signal.

8. The method of claim 1, wherein said input into said at least one input/output device further comprises a salutation of said electronic message.

9. The method of claim 1, further comprising:
    tracking behavior of a user; and
    determining from said behavior, a probability of said user attaching said type of said attachment if said user inputs said term into said at least one input/output device,
    wherein an indication is provided if said probability is greater than a threshold value.

10. A method, comprising:
    detecting an occurrence of a term in an input to a processing system having a processor, a memory, and at least one input/output device, said memory having an application executed by said processor, said input being received using said at least one input/output device into said memory for use by said processor and comprising an electronic message;
    recognizing using said processing system said term to be associated with a file type;
    determining using said processing system whether an attachment to said message is present and, if present, detecting a file type of said attachment before performing further processing of said input; and
    searching using said processing system for a potential error based on said file type of said attachment and said file type associated with said term.

11. A system, comprising:
    a device having a processor, a memory, and at least one input/output mechanism and configured to:
        detect an occurrence of a term in an input into said at least one input/output mechanism, the input comprising an electronic message to be sent;
        determine whether an attachment to said message is present and, if present, detect a type of said attachment from said term detected in said input before said electronic message is sent; and
        search for a potential error based on said type and said term.

12. The system of claim 11, the device further configured to provide an indication using said at least one input/output device to a user of said potential error.

13. The system of claim 12, the device further configured to provide a second indication to said user using said input/output device that no attachment is associated with said electronic message.

14. The system of claim 11, the device further configured to offer to assist said user using the input/output device in correcting said potential error.

15. The system of claim 11, the device further configured to determine whether said term indicates that an attachment should be associated with said electronic message.

16. The system of claim 11, wherein a user defines at least one of said term and said type.

17. The system method of claim 11, wherein said input into said at least one input/output mechanism further comprises an audio voice signal.

18. The system of claim 11, wherein said input into said at least one input/output mechanism further comprises a salutation of said electronic message.

19. The system of claim 11, the device further configured to:
    track behavior of a user; and
    determine from said behavior, a probability of said user attaching said type of said attachment if said user inputs said term into said at least one input/output device,
    wherein an indication is provided if said probability is greater than a threshold value.

* * * * *